United States Patent [19]

Napier et al.

[11] 3,954,664

[45] May 4, 1976

[54] ADDITION POLYMERIZATION PROCESS

[75] Inventors: Donald R. Napier, Corpus Christi, Tex.; Paul H. Washecheck, Ponca City, Okla.

[73] Assignee: Continental Oil Company, Ponca City, Okla.

[22] Filed: Jan. 10, 1972

[21] Appl. No.: 216,770

Related U.S. Application Data

[63] Continuation-in-part of Ser. No. 2,437, Jan. 12, 1970, abandoned, which is a continuation-in-part of Ser. No. 698,430, Jan. 17, 1968, abandoned.

[52] U.S. Cl............................ 252/429 R; 252/428; 252/431 C; 252/431 N; 526/119; 526/123; 526/125; 526/303; 526/328; 526/329; 526/541; 526/344; 526/347
[51] Int. Cl.² ........................................ B01J 27/26
[58] Field of Search............ 252/428, 429 R, 431 N, 252/438, 431 C

[56] References Cited

UNITED STATES PATENTS

| | | | |
|---|---|---|---|
| 2,927,088 | 3/1960 | Michalko et al. | 252/429 R X |
| 3,303,142 | 2/1967 | Maze et al. | 252/428 |
| 3,405,114 | 10/1968 | Naarmann et al. | 252/429 R X |
| 3,409,601 | 11/1968 | Borsini et al. | 252/428 X |
| 3,487,028 | 12/1969 | Smith | 252/438 |

*Primary Examiner*—Patrick P. Garvin
*Attorney, Agent, or Firm*—Cortlan R. Schupbach, Jr.

[57] ABSTRACT

A polymerization catalyst consisting of a cupric salt, a copper chelating agent, and a cyanide salt is disclosed for polymerizing vinyl monomers. Such a catalyst system is less hazardous than are the persulfate and peroxide catalysts; the molecular weight of the polymer is higher under comparable polymerization conditions; and the catalyst is not consumed by certain impurities which react with the prior art catalyst.

10 Claims, No Drawings

ADDITION POLYMERIZATION PROCESS

This is a continuation-in-part of application Ser. No. 2,437, filed Jan. 12, 1970 (now abandoned), which in turn is a continuation-in-part of application Ser. No. 698,430, filed Jan. 17, 1968 (now abandoned).

BACKGROUND OF THE INVENTION

This invention relates to catalytic free radical polymerization of vinyl monomers in a suspension or emulsion system.

It is well known in the art that vinyl organic compounds can be polymerized to form higher molecular weight compounds. It is also known that these vinyl compounds (monomers) undergo free radical polymerization more readily with certain catalysts, particularly oxidizing catalysts, such as peroxides and persulfates. These monomers upon standing undergo some autopolymerization, and high temperatures promote such polymerization. Since the monomers are often produced at one locality and the polymerization takes place at a different locality, often stabilizers are added to the monomer to insure that no polymerization will take place prior to the desired controlled polymerization to be carried out at the proper time under controlled conditions. Many of the known polymerization catalysts, such as persulfate salts, aziosobutyronitrile, benzoyl peroxide, and the like, are thermally unstable and present fire and/or explosion hazards. The stabilizers used with monomers consume conventional catalysts or initiators so that an excess of catalyst than that required for pure monomers must be used.

It is also known that different monomers can be copolymerized. Polymerization can be effected in vapor phase; however, most commercial polymerizations are carried out with the monomer suspended in an inert liquid or emulsion, generally in water. It is also well known that monomers used and concentration, temperature, catalyst, promoter, plasticizer, and the like, will affect the properties of the polymer formed. Depending upon the polymer, these materials are useful for molding, casting, film forming, and foaming into a multitude of products.

In suspension or emulsion polymerization, temperatures and pressures are chosen to optimize the production of a polymer of the desired characteristics, utilizing the particular catalyst. It is obvious that the temperature used must be below the vaporization temperature of any of the components of the system including the carrier liquid. With conventional catalysts, polymerization rates increase with temperature; but, at the same time, lower molecular weights of polymer are obtained at the higher temperatures. Therefore, catalysts and promoters are utilized to promote polymerization at relatively lower temperatures.

SUMMARY OF THE INVENTION

Vinyl monomers will undergo free radical polymerization in suspension or emulsion by use of a catalyst comprising a cupric salt, a chelating agent for copper and a cyanide salt.

DESCRIPTION OF PREFERRED EMBODIMENTS

As has been indicated, the catalyst of this invention is applicable to free radical polymerization of vinyl monomers by suspension or emulsion polymerization techniques. Temperatures, pressures, and residence times will depend upon the monomers; and thus all that can be said is that those conditions ordinarily employed with the prior art monomers will be operable. However, under comparable conditions, the present catalyst system produces polymers of higher molecular weight than does the prior art catalyst, such as peroxides and persulfates. That is, when the present catalyst systems are employed, the reaction rate and molecular weight vary with temperature in a markedly different manner than is observed with conventional catalysts. Most polymerizations are characterized by negative temperature coefficients. That is, the rates of initiation, propagation, and termination increase with increasing temperature; but the net effect is a decrease in molecular weight. Although in the present catalyst system the reactivity of the active species is influenced by temperature (e.g., increases with increasing temperature), the species is generated instantaneously with the combining of the catalyst components in a manner which is independent of temperature.

In practice, monomers often contain stabilizers and other reactive impurities which consume peroxide initiators so that these catalysts must be used in quantities considerably in excess of that which otherwise would be required for pure monomers. The catalyst system of this invention, with its low oxidation potential, is markedly less sensitive to stabilizers and impurities in this respect. Also, because of the low oxidation potential, the catalyst system of this invention is far less hazardous than are the conventional catalysts. That is, the catalysts of this system are much more stable in regard to fire and explosion, e.g., thermally stable.

As has been indicated, the catalyst system of this invention is particularly useful for free radical polymerization of vinyl monomers. Typical monomer types which undergo free radical polymerization include vinyl halides of the formula: (1) $CH_2 = CHX$; $CH_2 = CX_2$; $CX_2 = CX_2$ wherein X is fluorine, chlorine, bromine, or iodine; (2) vinyl esters of the formula $$CH_2=CH-O-\overset{O}{\underset{\|}{C}}-R$$

wherein R is alkyl or aryl; (3) acrylate esters of the formula

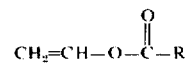

wherein R is alkyl or aryl; (4) methacrylate esters of the formula

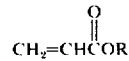

wherein R is alkyl or aryl; (5) acrylonitriles of the formula

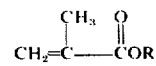

wherein R is H, alkyl or aryl; (6) acrylamides of the formula

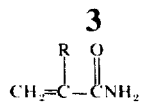

wherein R is H, alkyl or aryl; (7) styrenes of the formula

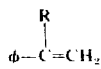

wherein R is H, alkyl or aryl; and (8) alpha olefins such as $CH_2 = CHR$; $CH_2 = CH — (CH_2)_n — CH = CH_2$ wherein R is alkyl and $n$ is 0 or an integer. Such monomers include ethylene, vinyl chloride, methyl methacrylate, ethyl acrylate, vinyl acetate, styrene, vinyl methyl ether, acrylonitrile, alpha octene, 1,3-butadiene and the like as well as mixtures of such monomers.

Such monomers are conventionally polymerized in suspensions as well as aqueous emulsions. Such systems are also well known to the art, as are emulsifying agents, both ionic and nonionic, for preparing the aqueous emulsions and comprise no part of the instant invention.

The catalyst of this invention comprises three components, namely (1) a soluble cupric salt such as cupric chloride, cupric sulfate, cupric acetate, and cupric nitrate; (2) a copper chelating agent such as ethylenediaminetetraacetic acid sodium salt, cyclohexanediaminetetraacetic acid sodium salt, tartaric acid salt, citric acid salt, nitrilotriacetic acid salt, phenanthroline, acetoacetic acid salt, and acetylacetone; and (3) a cyanide salt such as alkali metal cyanide salts as sodium cyanide, potassium cyanide, calcium cyanide, magnesium cyanide, ammonium cyanide, and tetramethyl ammonium cyanide.

Insofar as the soluble cupric salt is concerned it is theorized that the only requirement is that the salt be soluble so that copper (II) ions become available in the reaction mixture to oxidize cyanide ions to free cyanide radicals capable of initiating the polymerization. As for the cyanide salt, it is similarly theorized that it is only necessary that the salt be soluble in the reaction mixture so that cyanide ions are made available. The copper chelating agent is not particularly significant as to chemical identity as long as it performs a chelating function with copper. In this regard, it is theorized that by chelating the copper (II) ions the tendency for the cyanide ions to be drawn into close proximity with each other whereupon the cyanide ions couple to form stable cyanogen is substantially reduced or avoided. If the cyanide ions are permitted to couple and form cyanogen, they obviously are no longer available to be oxidized to form free cyanide radicals necessary for initiation of the polymerization. On the other hand, the copper (II) ion even though chelated is still able to oxidize the cyanide ions to free cyanide radicals.

While even weak chelating agents will function in the catalyst system to enable polymerization reactions to be carried out, the inherent viscosity and molecular weight of the polymers will not necessarily be as high as with polymers produced with a catalyst system employing a stronger chelating agent. The strength of the copper chelating agent of the catalyst system of this invention can be related to a stability constant defined as $$K = \frac{[Cu(II)Chelate]}{[Cu(II)][Chelate]}$$

In the present invention it is preferred that a copper chelating agent be used having a stability constant sufficient so that the log of K be equal to or above about 4 whereby the polymers produced with the catalyst system should have higher molecular weights.

The amount of catalyst is not critical; however, basing the copper portion of the catalyst system on monomer, as little as 0.0001 mol percent is operable. Preferably, at least 0.1 mol percent copper per mol monomer will be employed. While there is no operable maximum, little or no advantage is obtained in utilizing over 5 mol percent copper. The preferred range will be 0.1 to 1.0 mol percent copper as the soluble salt per mol of monomer employed.

Having established the preferred range of copper, then an amount of chelating agent equal to the copper or a slight excess will be used, e.g., 1 to 1.1 times the amount of chelating agent, which theoretically will chelate all of the copper, will ordinarily be used. Lesser amounts of chelating agent will leave some of the copper unavailable in the system, and larger amounts of chelating agent will be of no advantage. However, it should be obvious to those skilled in the art that these ratios are based on economics and not operability.

The molar ratio of the cyanide to copper should be at least 2:1, generally in the range of 2–6:1, and preferably in the range of 2–4:1. Again, smaller amounts of cyanide could be used; however, some of the copper would be left. When more cyanide is used, no advantage is obtained; however, the system is still operable.

It was surprising that cupric chloride, a known inhibitor, functions in this system. (See "Die Makromolekulare Chemie" 98, 285 (1966) and "Transactions of the Faraday Society" 61, 1206 (1965).)

The following examples will serve to further illustrate the invention.

EXAMPLE 1

In order to demonstrate the effectiveness of the catalyst system of this invention in polymerizing vinyl monomers, a series of polymerization runs were made using methyl methacrylate (MMA) as the monomer. Each run was performed by adding 0.5 g portion of detergent (sodium salt of a $C_{12}$-$C_{14}$ alkylbenzene sulfonic acid) to a three-necked flask followed by addition of a solution of a cupric compound and chelating agent dissolved in about 200 ml of water. Monomer was then added and the solution was purged with nitrogen, stirred vigorously, and heated to the reaction temperature. After the temperature had been reached, the soluble alkali cyanide was injected to the reaction mixture over a period of about 1 to 60 minutes. Heating was continued for a total of three hours after the desired temperature had been reached. The mixture was then poured into a brine solution at room temperature, thereby precipitating the polymer which was recovered by filtration. The filter cake was macerated in a blender with water and then refiltered. This second filter cake was thoroughly washed with water and dried followed by determination of inherent viscosity and average molecular weight. The results are given in the following table.

Table 1

| Run Number | 1 | 2 | 3 | 4 | 5 | 6 | 7 | 8 |
|---|---|---|---|---|---|---|---|---|
| MMA (parts by weight) | 27.21 | 23.92 | 25.00 | 25.00 | 25.19 | 25.12 | 46.88 | 24.01 |
| CUPRIC COMPUND (parts by weight) | | | | | | | | |
| $CuCl_2$ | 0.337 | 0.337 | | | 0.334 | 0.034 | 0.033 | 0.330 |
| $CuSO_4.5H_2O$ | | | 0.624 | | | | | |
| $Cu(OCCH_3)_2.2H_2O$ | | | | 0.500 | | | | |
| CHELATE (parts by weight) | | | | | | | | |
| EDTA (Na salt)[a] | 0.811 | 0.802 | | | 0.824 | 0.083 | 0.086 | 0.837 |
| NTA (Na salt)[b] | | | 0.535 | | | | | |
| CDTA (Na salt)[c] | | | | 1.000 | | | | |
| CYANIDE (parts by weight) | | | | | | | | |
| NaCN | 0.604 | 0.601 | 0.604 | 0.604 | 0.245 | 0.025 | 0.024 | 0.622 |
| REACTION TEMP. (°C.) | 85 | 85 | 85 | 85 | 85 | 85 | 50 | 25 |
| YIELD (%) | 92.7 | 78.9 | 79.8 | 80.0 | 68.9 | 63.1 | 93.6 | 0 |
| INHERENT VISCOSITY (n) | 2.71 | 2.74 | 2.14 | 2.86 | 3.01 | 3.12 | 4.97 | — |
| MOL. WT. ($\times 10^6$) | 3.25 | 3.30 | 2.32 | 3.51 | 3.77 | 3.98 | 7.71 | — |

[a] Sodium salt of ethylene diaminetetraacetic acid, log K = 18.8
[b] Sodium salt of nitrilotriacetic acid, log K = 12.7
[c] Sodium salt of 1,2-diaminocyclohexanetetraacetic acid, log K = 21.3

EXAMPLE 2

For comparison with the results shown in Example 1, several conventional persulfate polymerization runs were made as follows. Ammonium persulfate initiated polymerizations were run by placing 0.5 g of the detergent in a threenecked flask as in Example 1 and adding a solution of ammonium persulfate dissolved in 250 ml of water. The MMA monomer was added, the system was then purged with nitrogen, stirred vigorously, and heated to the reaction temperature. After the temperature was reached, heating was continued for three hours. The mixture was worked up as for the runs in Example 1 and polymer recovered. The results are shown in the following table.

Table 2

| Run Number | 1 | 2 | 3 |
|---|---|---|---|
| MMA (parts by wt.) | 26.39 | 25.28 | 24.52 |
| Ammonium Persulfate (parts by wt.) | 0.579 | 0.058 | 0.056 |
| Reaction Temp. (°C.) | 85 | 85 | 50 |
| Yield (%) | 94.7 | 95.8 | 94.6 |
| Inherent Viscosity (n) | 1.09 | 0.96 | 2.65 |
| Mol. wt. ($\times 10^6$) | 0.88 | 0.73 | 3.14 |

As is apparent from a comparison of the above data with that of Table 1, the catalyst system of the present invention under comparable reaction conditions provides a polymer product having significantly higher inherent viscosity and molecular weight that polymer products produced using a conventional ammonium persulfate catalyst.

EXAMPLE 3

A single polymerization run wherein a 1:1 molar mixture of methyl methacrylate and styrene was polymerized using the catalyst system of this invention and was performed as described in Example 1. A total of 26.10 parts by weight of the monomer mixture was employed along with a catalyst system of 0.300 parts by weight $CuCl_2$, 0.820 parts by weight of the sodium salt of EDTA and 0.597 parts by weight of NaCN. The reaction was carried out at 85°C. A polymer product yield of about 83.6% was obtained having an inherent viscosity of 1.02 and an average molecular weight of $0.80 \times 10^6$.

Thus, the catalyst system of this invention is effective for copolymerizations as well as homopolymerizations.

EXAMPLE 4

The effect of employing a copper chelating agent having a log K value below about 4 in the catalyst system of this invention was demonstrated by conducting a polymerization run similarly as described in Example 1 except that a total of about 24.92 parts by weight of MMA was employed with a catalyst system of 0.335 part by weight $CuCl_2$, 0.610 parts by weight NaCN and about 10 ml conc $NH_4OH$ (28%) (log K = 2.1). The polymerization was conducted at 85°C. and resulted in a yield of 12.6% polymer having an inherent viscosity of 1.02 and a molecular weight of about $0.80 \times 10^6$.

As is apparent upon comparison with Example 1, the use of a weak copper chelatling agent, i.e., $NH_3$, results in lower yields and lower molecular weight polymer than when chelating agents having stability constants wherein log K is above 4.

EXAMPLE 5

Another series of polymerization runs were conducted to demonstrate the ineffectiveness of catalyst systems employing only two of the three components of the catalyst system of this invention. The polymerizations were conducted as described in Example 1 except that in one the catalyst system comprised only $CuCl_2$ and the sodium salt of EDTA; the second catalyst system comprised only $CuCl_2$ and NaCN and the third catalyst system comprised only cuprous cyanide and NaCN. The details and data of these runs are shown in the following table.

Table 3

| Run Number | 1 | 2 | 3 |
|---|---|---|---|
| MMA (parts by wt.) | 24.94 | 26.24 | 24.98 |
| $CuCl_2$ (parts by wt.) | 0.333 | 0.334 | — |
| NaEDTA (parts by wt.) | 0.826 | — | — |
| NaCN (parts by wt.) | — | 0.605 | 2.519 |
| CuCN (parts by wt.) | — | — | 0.226 |
| Reaction Temp. (°C.) | 85 | 85 | 85 |
| Yield (%) | 3.8 | 9.3 | 0 |
| Inherent Viscosity (n) | 1.66 | 1.61 | — |
| Mol. wt. ($\times 10^6$) | 1.22 | 1.04 | — |

The data in the above table compared to Example 1 indicates that all three of the components of the catalyst system need to be present for an effective polymerization reaction. It is also indicated (Run 3) that in the absence of any cupric ion (cuprous only used) there is no generation of free cyanide radicals to initiate the polymerization.

Typical polymerization conditions using the catalyst system of this invention are shown in Table 2. The parts of the three-component system suitable are the same as indicated above for the methyl methacrylate polymerization. The column headed Typical Initiator shows the prior art initiator. In carrying out the polymerization with the three-component system of this invention, similar increases in molecular weight will result over the prior art initiators as was shown with methyl methacrylate.

Table 3

| | | FREE RADICAL POLYMERIZATIONS | | |
|---|---|---|---|---|
| Monomer | Structure | Type of Polymerization | Usual Run Temperature | Typical Initiator |
| Vinyl Chloride | $CH_2=CHCl$ | Emulsion | 40°C | Persulfate |
| | | Emulsion | 40–50 | $H_2O_2$ |
| | | Suspension | 40 | Persulfate |
| Vinylidene Chloride | $CH_2=CCl_2$ | Emulsion | 30 | Persulfate |
| Vinyl Acetate | $CH_2=CHOCCH_3$ (O) | Solution | 50–80 | a,a'-Azodiiso-butyronitrile |
| | | Emulsion | 40 | |
| | | Suspension | 40 | Benzoyl Peroxide a,a'-Azodiiso-butyronitrile |
| Methyl Acrylate | $CH_2=CHCOCH_3$ (O) | Emulsion | 50–95 | Persulfate |
| Methyl Methacrylate | $CH_2=C(CH_3)COCH_3$ (O) | Suspension | 80–95 | a,a'-Azodiisobutyronitrile |
| Acrylonitrile | $CH_2=CHCN$ | Suspension | 40 | Persulfate |
| | | Emulsion | 35 | Persulfate |
| Methacrylonitrile | $CH_2=C(CH_3)CN$ | Emulsion | 50–85 | Persulfate |
| Acrylamide | $CH_2=CHCNH_2$ (O) | Solution | 65–80 | Persulfate |
| Styrene | $\phi CH=CH_2$ | Emulsion | 70–95 | Persulfate |
| | | Emulsion | 80 | $H_2O_2$ |
| | | Suspension | 80 | Benzoyl Peroxide |

The invention has been illustrated in its preferred form; however, it will be understood by those skilled in the art that many modifications can be made. For example, vinyl monomers generally can be homopolymerized or copolymerized with one or more additional vinyl monomers. Plasticizers, modifiers, and the like can be present in the systems during polymerization, if desired, as is well known in the polymer art.

Having thus described our invention, we claim:

1. A free radical catalyst system consisting essentially of a copper salt which yields the cupric ion in aqueous solution, a copper (II) chelating agent and a water soluble cyanide selected from the group consisting of an alkali metal cyanide, alkaline earth metal cyanide, ammonium cyanide and tetramethyl ammonium cyanide.

2. The catalyst system of claim 1 wherein said chelating agent is present in an amount sufficient to chelate all of the copper, and the cyanide salt is present in a molar ratio of cyanide to copper of at least 2:1.

3. The catalyst system of claim 2 wherein the cyanide molar ratio to the copper is present in the range of 2 to 6 mols cyanide to 1 mol copper.

4. The catalyst system of claim 1 wherein the copper chelating agent has a log K stability constant above 4.

5. A free radical catalyst system consisting essentially of a copper salt which yields the cuperic ion in aqueous solution and is selected from the group consisting of cupric chloride, cupric sulfate, cupric acetate or cupric nitrate; a copper (II) chelating agent and a water soluble cyanide selected from the group consisting of an alkali metal cyanide, alkaline earth metal cyanide, ammonium cyanide and tetramethyl ammonium cyanide.

6. The catalyst system of claim 5 wherein the copper (II) chelating agent is ethylenediamine-tetraacetic acid sodium salt, cyclohexanediamine-tetraacetic acid sodium salt, tartaric acid sodium salt, citric acid sodium salt, nitrilotriacetic acid sodium salt, phenanthroline, acetoacetic acid sodium salt, ammonia or acetylacetone.

7. The catalyst system of claim 6 wherein the chelating agent is present in an amount at least sufficient to chelate all of the copper and the cyanide is present in at least a molar ratio of 2/1, cyanide to copper.

8. The catalyst system of claim 7 wherein the copper salt is cupric chloride, the copper (II) chelating agent is ethylenediamine tetraacetic acid sodium salt, and the cyanide is sodium cyanide.

9. The catalyst system of claim 7 wherein the copper salt is cupric sulfate, the copper (II) chelating agent is nitrilotriacetic acid sodium salt, and the cyanide is sodium cyanide.

10. The catalyst system of claim 7 wherein the copper salt is cupric acetate, the copper (II) chelating agent is cyclohexanediamine tetraacetic acid sodium salt.

* * * * *